US010302532B2

(12) United States Patent
Anenson et al.

(10) Patent No.: US 10,302,532 B2
(45) Date of Patent: May 28, 2019

(54) TEST WHEEL FOR USE IN A TIRE ANALYSIS MACHINE

(71) Applicant: AKRON SPECIAL MACHINERY, INC., Akron, OH (US)

(72) Inventors: Troy L. Anenson, Akron, OH (US); Byron R. Stanoszek, Hinckley, OH (US); Daniel P. Furst, Stow, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 278 days.

(21) Appl. No.: 15/283,638

(22) Filed: Oct. 3, 2016

(65) Prior Publication Data
US 2018/0095009 A1    Apr. 5, 2018

(51) Int. Cl.
*G01M 17/02*  (2006.01)
*G01M 99/00*  (2011.01)

(52) U.S. Cl.
CPC .......... *G01M 17/027* (2013.01); *G01M 99/00* (2013.01)

(58) Field of Classification Search
CPC ........................... G01M 17/027; G01M 99/00
See application file for complete search history.

(56) References Cited

U.S. PATENT DOCUMENTS

| | | | |
|---|---|---|---|
| 6,931,911 B1 * | 8/2005 | Delmoro | G01M 17/021 73/1.14 |
| 2012/0079868 A1 * | 4/2012 | Okada | G01L 25/00 73/1.15 |

* cited by examiner

*Primary Examiner* — Manuel L Barbee
(74) *Attorney, Agent, or Firm* — Renner Kenner Greive Bobak Taylor & Weber (57) ABSTRACT

An analysis machine uses a test wheel to confirm operation of measurement sensors and software algorithm associated with the analysis machine. The machine includes at least one laser measurement device that measures dimensional characteristics of tires received in the analysis machine. A test wheel is receivable and rotatable in the analysis machine, wherein the test wheel has a known dimensional configuration detected by the at least one laser measurement device to confirm the accuracy of the at least one laser measurement device and/or confirm performance of the software algorithm.

17 Claims, 8 Drawing Sheets

TEST WHEEL FOR USE IN A TIRE ANALYSIS MACHINE

TECHNICAL FIELD

Generally, the present invention is directed to tire analysis machines. In particular, the invention is directed to tire analysis machines such as machines that check tire uniformity, geometry and/or balancing, wherein each of these machines employ at least one measurement device. Specifically, the present invention is directed to a test wheel used in tire analysis machines to ensure that tire measurement devices used by the machines, such as lasers, are calibrated and functioning properly.

BACKGROUND ART

In tire analysis machines, a tire is tested by rotating it at various speeds to ensure that the tire has been constructed to perform within quality control standards. During this testing process, the tire rotates, and the analysis machine examines the tire's integrity, shape and surface qualities to a high degree of accuracy. At times, during examination, the analysis machine detects irregularities in the tire. These irregularities are typically detected by laser sensors which can detect various dimensional changes.

Laser measuring devices are strategically mounted on the machine to measure the tread and sidewalls of the tire. As the machine is used over a period of time the lasers may become misaligned, stop measuring accurately or simply stop functioning properly. In the past, self-diagnostics have been employed to determine the accuracy of the lasers. But these were found lacking. One solution is to mount to the machine a small diameter motorized steel wheel of known size. The steel wheel is rotated by its motor and measured by the lasers. This configuration requires machine down time and was only configured to test lasers that measured tire sidewalls, not the tread. In another solution a test ring with a known dimensional configuration is positioned within the analysis machine. However, the test ring is not received within the machine's chuck assemblies while rims are installed. Instead, the analysis machine requires that its upper and lower rims be removed to engage the test ring. As such, the rims of the machine must be changed out each time a test is needed, resulting in undesired downtime of the machine.

No prior art device is known which currently checks the tread and sidewall measurement accuracy of the measuring devices. In particular, there is no known test wheel which provides for multiple known tire geometry measurements (i.e. runouts, bulges and/or depressions, wobble, etc.) to check the accuracy of the laser measuring device and its software algorithm or which provides a test wheel that is received in the analysis machine without having to disassemble the machine or otherwise increase downtime of the machine. Therefore, there is a need in the art for a test wheel which provides for known dimensional features for confirming the operational accuracy of the laser measuring devices and to do so with minimal downtime.

SUMMARY OF THE INVENTION

In light of the foregoing, it is a first aspect of the present invention to provide a test wheel for use in a tire analysis machine.

It is another aspect of the present invention to provide a test wheel used in an analysis machine, comprising a hub adapted to be received in the analysis machine, a test ring extending from the hub, the test ring having a test surface which provides a known dimensional configuration for measurement by devices carried by the analysis machine.

Yet another aspect of the present invention is to provide an analysis machine that uses a test wheel to confirm operation of measurement sensors, comprising an analysis machine, at least one laser measurement device associated with the analysis machine, wherein the at least one laser measurement device measures dimensional characteristics of tires received in the analysis machine, and a test wheel receivable in and rotatable by the analysis machine, the test wheel having a known dimensional configuration detected by the at least one laser measurement device to confirm the accuracy of the at least one laser measurement device.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
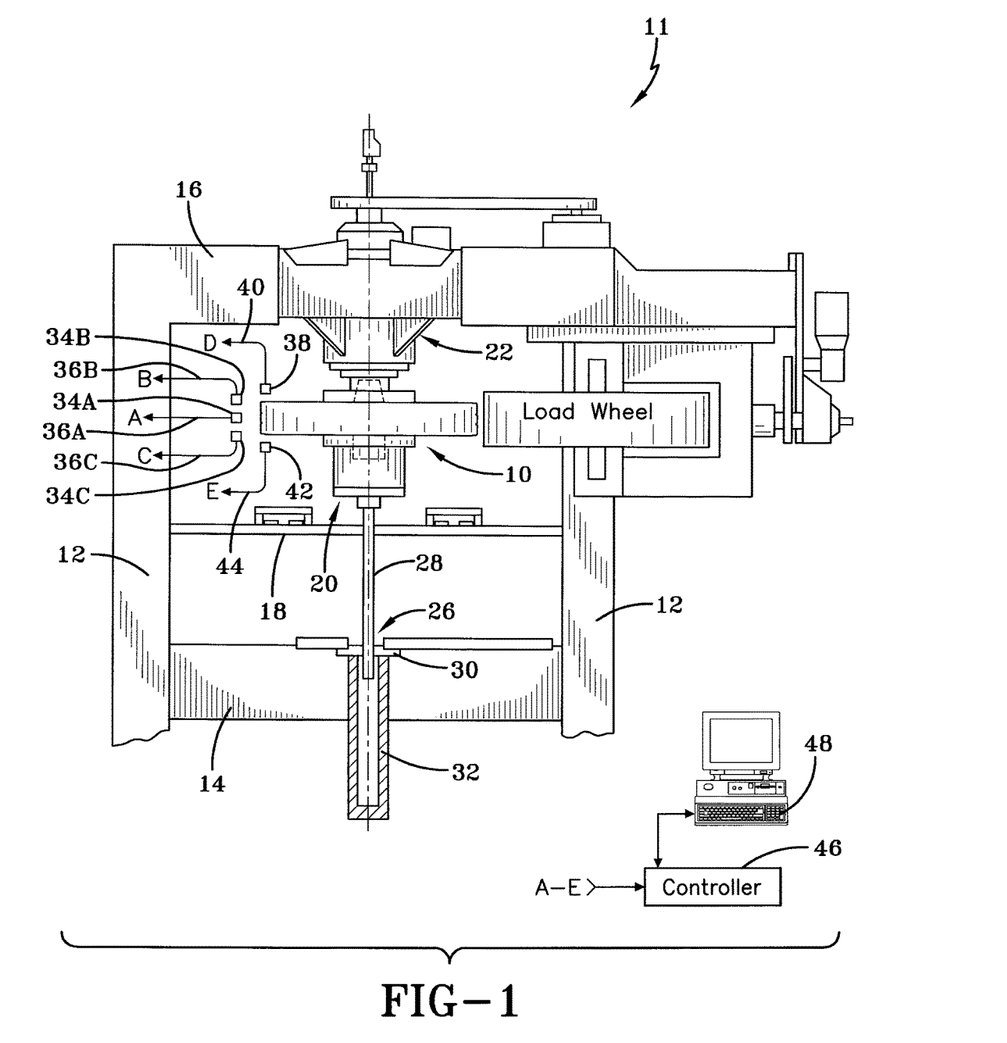
FIG. 1 is a schematic diagram of a tire analysis machine with a test wheel according to the concepts of the present invention.
Figure 2:
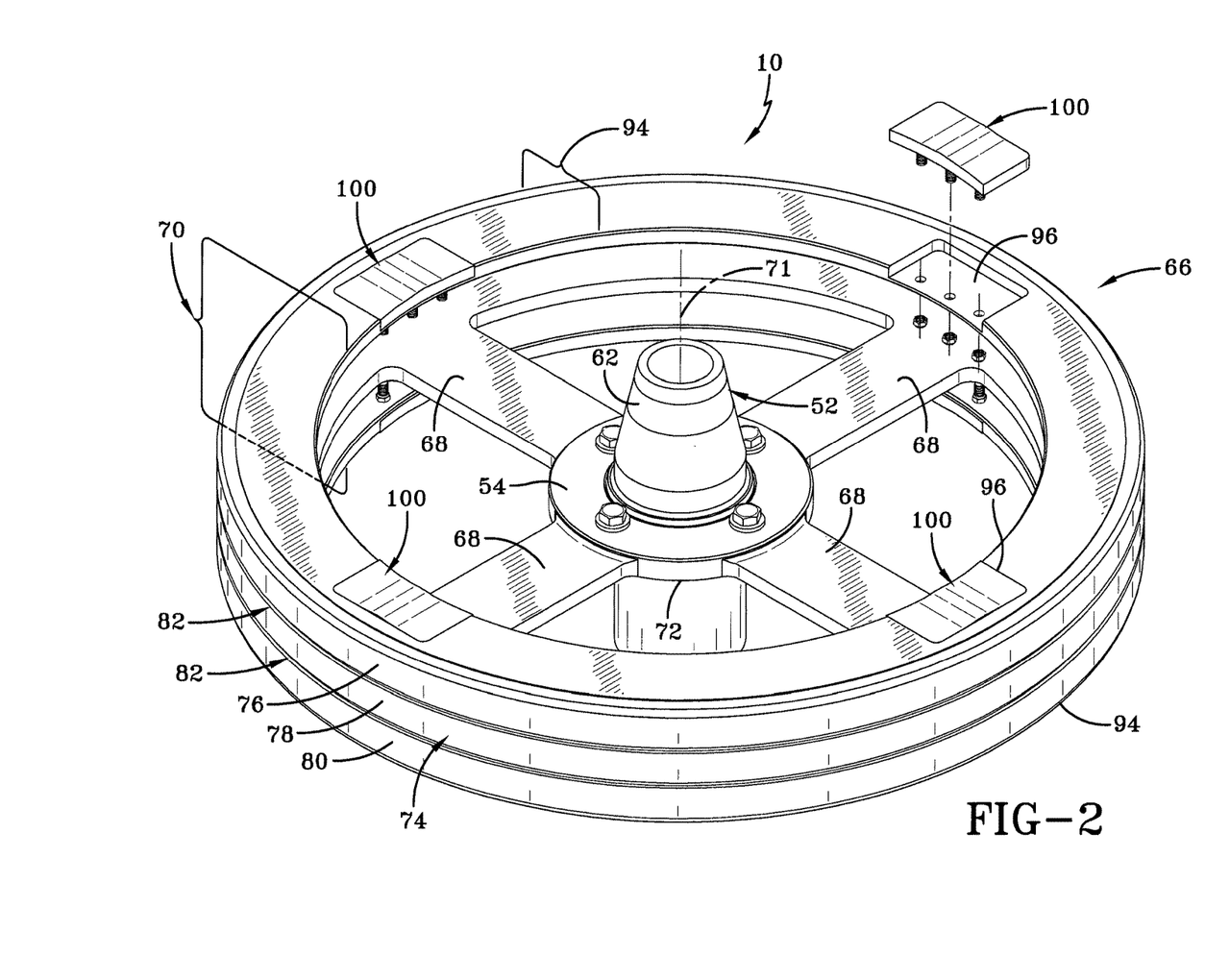
FIG. 2 is a perspective view of the test wheel according to the concepts of the present invention.
Figure 3:
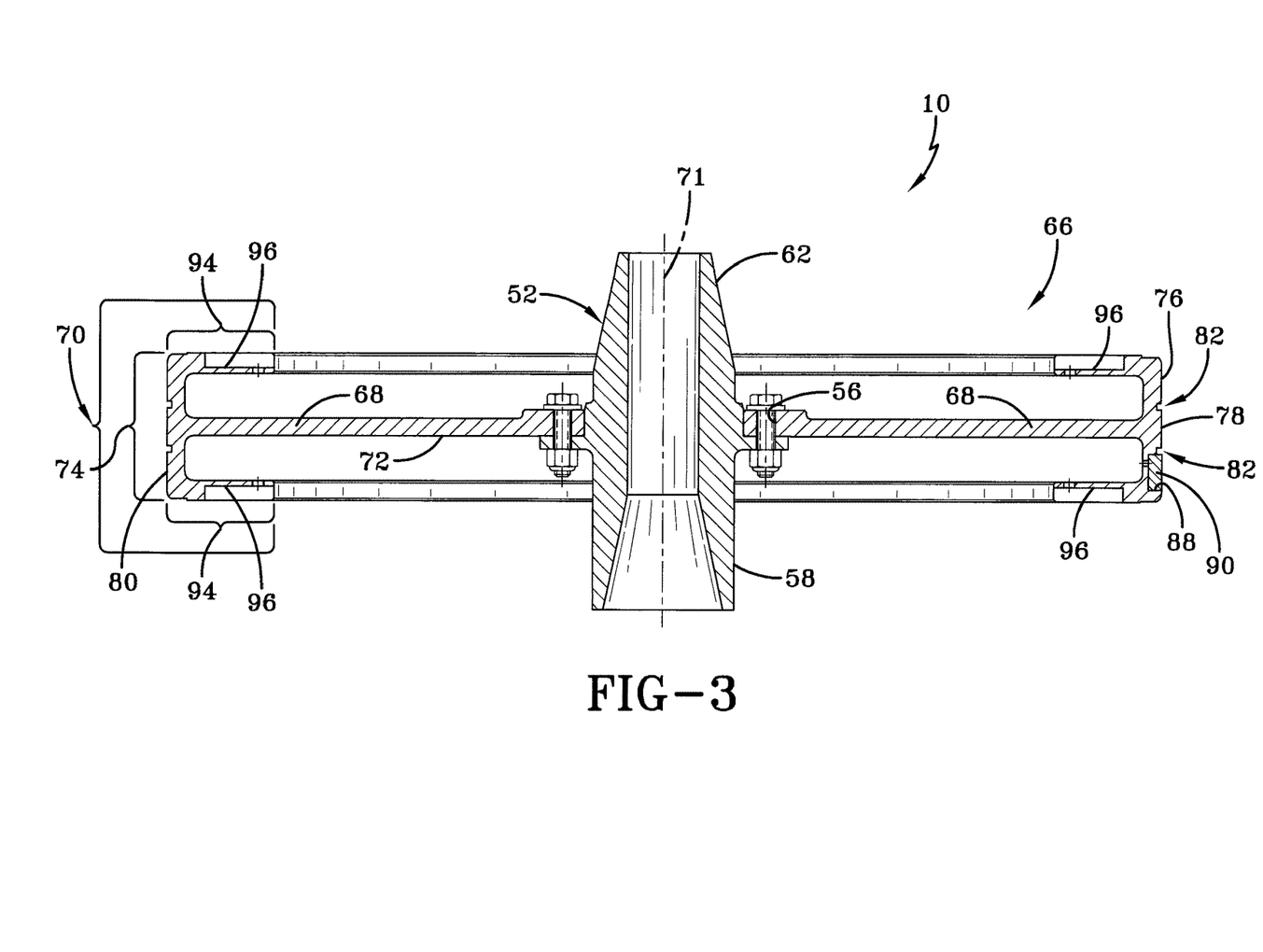
FIG. 3 is an elevational view, in cross-section, of the test wheel according to the concepts of the present invention.
Figure 4:
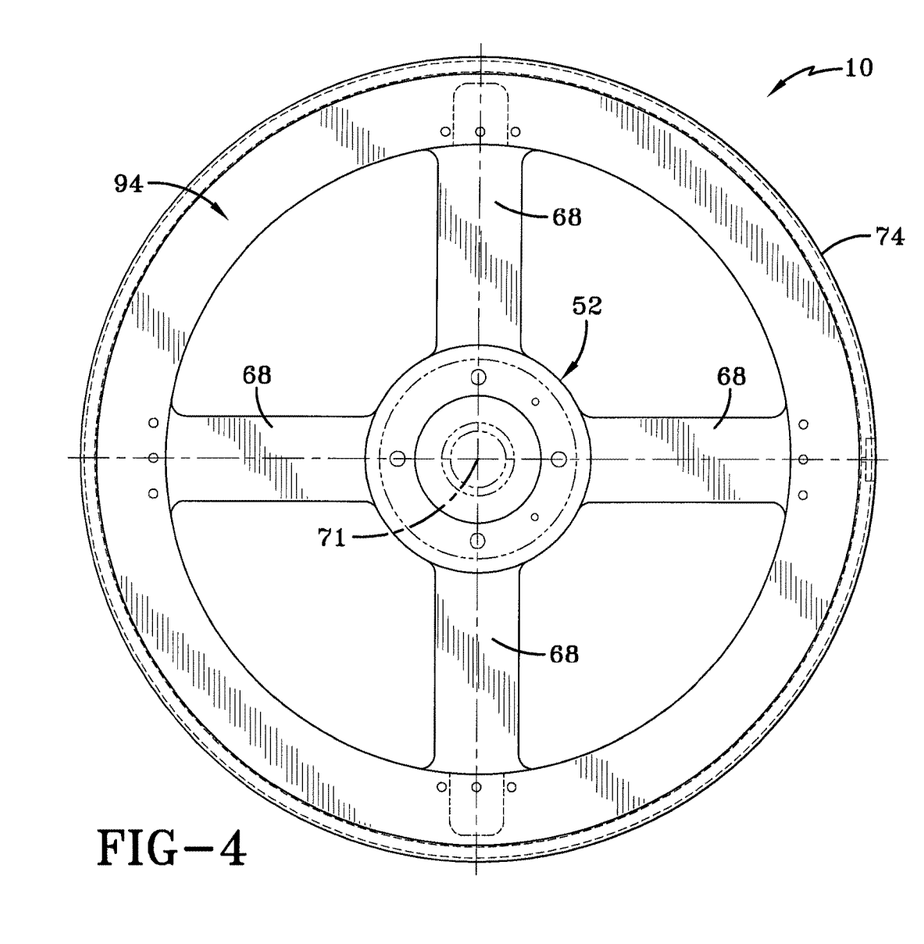
FIG. 4 is a top view of the test wheel according to the concepts of the present invention.

Referring now to the drawings and in particular to FIGS. 1 and 2, it can be seen that a test wheel, which is designated generally by the numeral 10, is receivable in an analysis machine which is designated generally by the numeral 11. The machine includes side frame members 12 which may be connected at respective ends by a horizontal bottom frame member 14 and a horizontal top frame member 16. The side frame members 12 and frame members 14 and 16 form a box-like structure within which a tire, which may have been recently manufactured, is received, tested and discharged. A conveyor 18 is configured with rollers which have openings therebetween upon which the tire or the test wheel 10 is delivered to the machine 11. The machine shown generally represents a tire uniformity machine. However, skilled artisans will appreciate that other tire analysis machines, such as a tire geometry machine, a tire dynamic balance machine, or the like may employ the test wheel as described herein.

The machine 11 includes an apparatus for receiving and rotating the manufactured tire or the test wheel 10. In particular, a lower spindle and chuck assembly 20 and an upper spindle and chuck assembly 22 are respectively positioned below and above the conveyor 18. Both the lower and upper spindle and chuck assemblies are outfitted with removable rims which may be in various sizes as needed to fit the bead diameter of a tire to be tested. In the present embodiment, the rims may remain in place whenever the test wheel 11 is received in the machine. This feature reduces the machine downtime when using the test wheel.

The lower spindle and chuck assembly 20 is carried and supported by the frame members 12 and 14 and is positioned so as to engage an underside of the tire as it is supported by the conveyor 18. In particular the lower spindle and chuck assembly 20 includes a hydraulic unit 26 which provides a shaft 28 that maintains a piston 30 contained within a cylinder 32. At the appropriate time during normal operation, the hydraulic unit engages the tire and, in particular a lower bead of the tire or a similar structural feature of the test wheel, through an opening in the conveyor 18 so as to move the tire or test wheel into a testing position.

The upper spindle and chuck assembly 22 receives the other side of the tire or test wheel on the rim when the lower spindle and chuck assembly engages the facing sidewall at the bead of the tire or test wheel on the rim attached to the lower spindle and chuck assembly 30. The spindle and chuck assembly 22 is rotated by a spindle, and the assembly 22 may also include spindle bearings, a rim adapter and other associated components. The spindle is driven by a motor and an interconnecting belt drive which connects the spindle to the motor.

Briefly, in operation, the tire is delivered along the conveyor 18 and stopped at the appropriate position so that the lower spindle and chuck assembly can engage the lower facing side of the tire. The lower rim assembly then moves the tire into engagement with the upper rim assembly, whereupon the tire is inflated and then rotated to initiate the testing process. In some instances, the tire may be engaged by a load wheel during rotation.

The machine 11 may carry any number of sensors on the various side members 12, bottom frame member 14 and/or top frame member 16. Skilled artisans will further appreciate that the sensors may be located in proximity to the machine 11 but not be carried directly by the machine. In other words, the sensors may be carried and/or supported by an adjacent apparatus. In any event, a center tread laser sensor 34A may be carried by any one of the members 12, 14 and/16. It will further be appreciated that the sensor 34A may be positionable into and out of alignment with a tread of the tire under test. The sensor 34A may be a spot laser or a line laser, or other equivalent measuring-type device. In any event, the sensor 34A may generate an output 36A designated generally by the capital letter A. Additional similarly-operated tread laser sensors may be employed. A top tread laser sensor 34B may be carried and positioned above the center tread laser sensor 34A and which generates an output 36B designated generally by the capital letter B. In a similar manner, a bottom tread laser sensor 34C may be carried and positioned below the sensor 34A and generate an output 36C designated by the capital letter C. In a similar manner, an upper sidewall sensor 38 may also be carried by the machine 11 and, in particular, by any one or combination of the side frame members 12, bottom frame members 14, and/or top frame member 16. The sensor 38 may generate an output 40 designated with the capital letter D. A lower sidewall sensor 42 may also be carried by the machine 11 and, in particular, by any one or combination of the side frame members 12, the bottom frame members 14, and/or the top frame member 16. The sensor 42 may generate an output 44 designated generally by the capital letter E. As will be understood as the description proceeds, the sensors 34, 38 and 42 measure the dimensions of the tire under test or the test wheel 10. In particular, the sensors detect the dimensional characteristics or measurement values of the observed tire or the test wheel.

All of the outputs A-E may be received by a controller 46 which may be connected to at least a general purpose computer 48. As will be appreciated by skilled artisans, the controller 46 and/or the computer 48 may be configured with appropriate hardware and/or a software algorithm to receive, collect, monitor and otherwise evaluate any one or all of the output signals A-E to determine properties of the tire under test, the test wheel or whether the associated sensors are operating correctly. In other words, the controller 46 and/or the computer 48 maintains or stores expected measurement values of the test wheel which are compared at the appropriate time to the measurement values of the test wheel. As will be understood, the expected measurement values are also known as the known dimensional configuration. The software algorithm may also operate as a verification of the measurement process. In other words, either the computer or the controller produces diagnostic information to be interpreted by a machine operator. For example, if no measurement readings are detected in a measurement area where expected, the machine's operator can further investigate why this condition is present.

Referring now to FIGS. 2-5, the test wheel 10, which may be received in the machine 11, is shown. The test wheel includes a hub 52 which is adapted to be received and rotated by the lower and upper spindle and chuck assemblies 20 and 22. The hub 52 includes a mount plate 54 with a plurality of holes 56 extending therethrough. Extending downwardly from the mount plate 54 is a collar 58 which is received and engaged by the lower spindle assembly 20. Extending upwardly from the mount plate, in a direction opposite the collar 58, is a nose cone 62. The nose cone 62 may be received and engaged by the upper spindle assembly 22.

A test ring 66 is connected to the mount plate 54 by fasteners extending through the mount plate holes and the collar 58 that defines an inner diameter of the test ring. In some embodiments the hub 52 and the test ring 66 may be welded, integral, or otherwise connected to one another. The test ring 66 may include a plurality of spokes 68 radially extending from the mount plate 54. Skilled artisans will appreciate that any number of spokes may be employed including a single solid spoke.

Extending from an outward radial edge of the spokes is a test surface designated generally by the numeral 70. The test surface 70 provides a known dimensional configuration, shape or construction. As used herein, the known dimensional configuration refers to the dimensions of the test wheel 10. Although any point of reference may be used for determining a dimension of the test wheel, the test wheel 10 includes an axis 71 from which all radial dimensions may be determined. Similarly, the test wheel 10 includes a radial reference plane 72, which may be a bottom surface of the mount plate 54, from which all lateral dimensions may be determined. When measured by the sensors 34, 38 and/or 42, the lateral and radial dimensions may be determined by reference to the radial reference plane and the axis. If the measured dimensions do not match the known dimensional configuration or the expected measurement values stored by the computer 52 and/or controller 50, then it is known that at least one of the sensors is out of alignment or not operating to a predetermined standard.

The test surface 70 may include a tread surface 74 which has a known radial dimension from the axis 71. Skilled artisans will appreciate that the tread surface 74 may comprise different diameter sections. In particular, the tread surface 74 may include a sub-section 76, a sub-section 78, and/or a sub-section 80. Although three different sub-sections are shown, it will be appreciated that the tread surface 74 may be a single diameter or any number of diameters as described herein. Each sub-section 76, 78 and 80 may be separated by a gap 82 so as to clearly distinguish the different sections from one another. Each gap 82 may be of a predetermined depth and width. In some embodiments, any one or all of the sections 76/78/80 may have a sub-section pocket 88. The sub-section pocket 88 may then have a tread insert 90 received and secured within the pocket 88. As will be discussed in detail below, the tread insert may have predetermined or expected dimensional values, which may be different than the sub-section diameter, which should be detected by the appropriate sensor.

Figure 5:
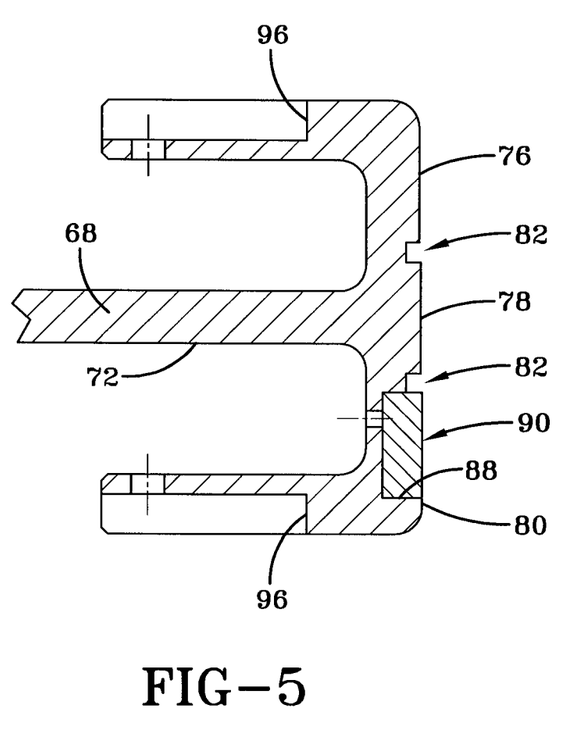
FIG. 5 is a detailed view of a tread and sidewall surface of the test wheel according to the concepts of the present invention.

Each of the sub-sections, as best seen in FIG. 5, may have a slightly different outer diameter as measured from the axis 71 which is detectable by the tread sensor 34. In other words, each sub-section has a known radial dimension, and each known radial dimension may be different from the other. Also detectable by the tread sensor will be the gaps 82.

Extending from at least one lateral edge of the tread surface 74 is a sidewall surface 94. Although two sidewall surfaces 94 are shown, skilled artisans will appreciate that only a single sidewall surface 94 may be provided. The sidewall surfaces 94 are substantially perpendicular to the tread surface 74 and may extend in a direction toward the hub 52. The surfaces 94 extend in a substantially planar direction that is parallel to the spokes 94 and which provides a known lateral dimension from the radial reference plane 72. The sidewall surfaces 94 are constructed and positioned so as to be in proximity to and measurable by the associated upper and lower sidewall sensors 38 and 42. Each of the sidewall surfaces 94 may be provided with a sidewall pocket 96. As will be discussed below, each sidewall pocket 96 may receive a sidewall insert designated generally by the numeral 100. Both the inserts 90 and 100 provide for known dimensional changes which should be detectable by the measuring sensor.

Figure 6:
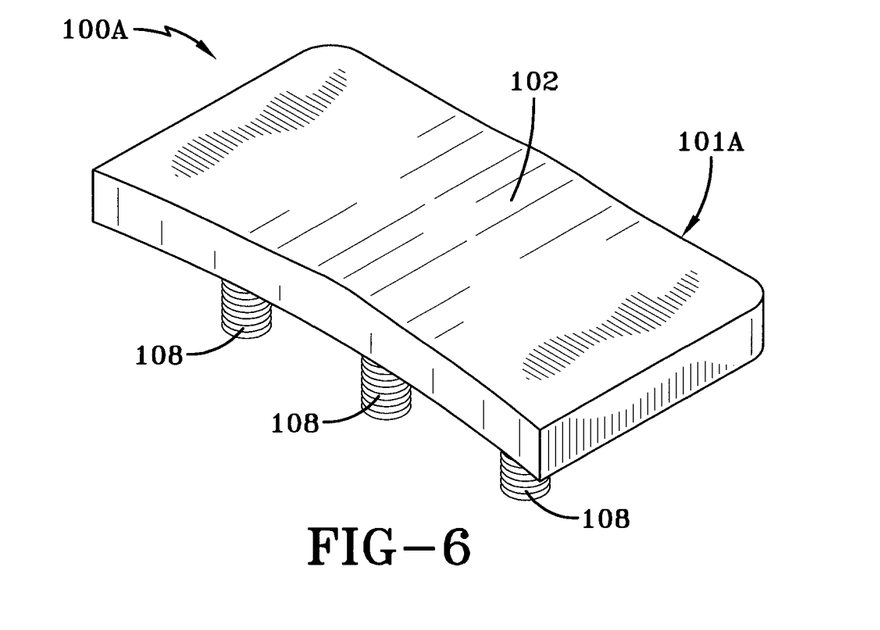
FIG. 6 is a perspective view of a sidewall insert with a bulge used with the test wheel according to the concepts of the present invention.
Figure 7:
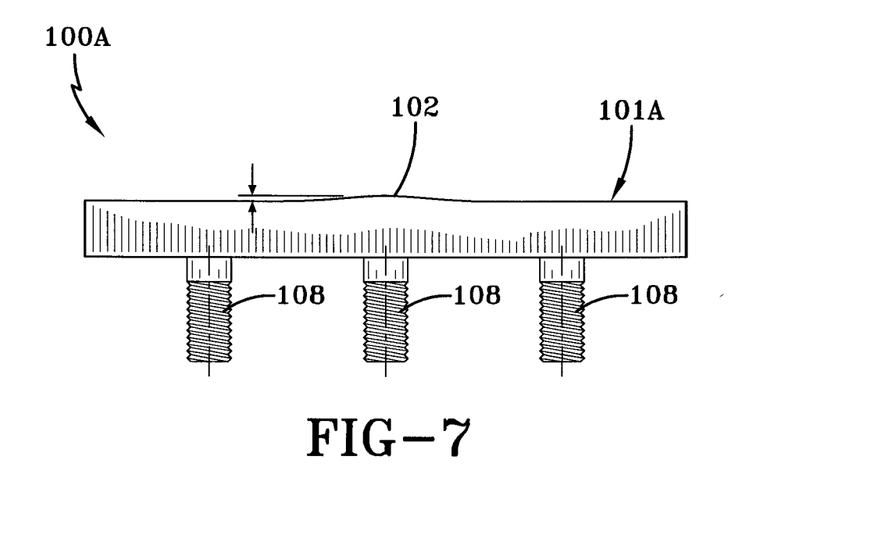
FIG. 7 is an elevational view of the sidewall insert shown in FIG. 6 according to the concepts of the present invention.

Referring now to FIGS. 6 and 7, it can be seen that a sidewall insert 100A includes a body 101A. Body 101A includes a bulge 102 of predetermined height. Moreover, the bulge 102 may have a defined progression from a main surface of the body to an apex of the bulge and a predetermined progression from the bulge returning to the main surface of the body. In some embodiments the body 101A may match the lateral dimensions of the sidewall surface 94. Skilled artisans will appreciate that any progression and/or bulge dimension is predetermined as part of the expected measurement values and should be detected by the sensors as appropriate.

Figure 8:
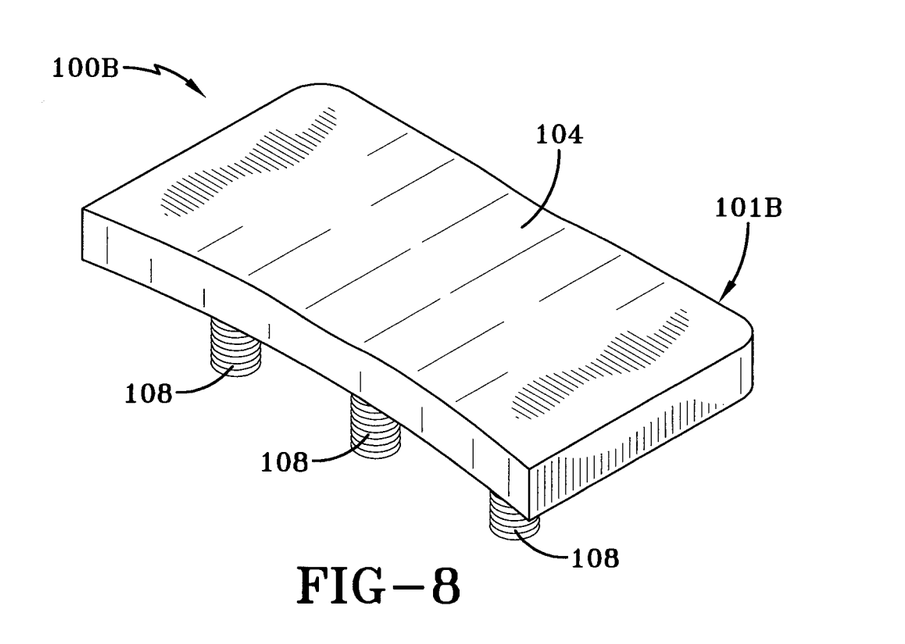
FIG. 8 is a perspective view of a sidewall insert with a depression used with the test wheel according to the concepts of the present invention.
Figure 9:
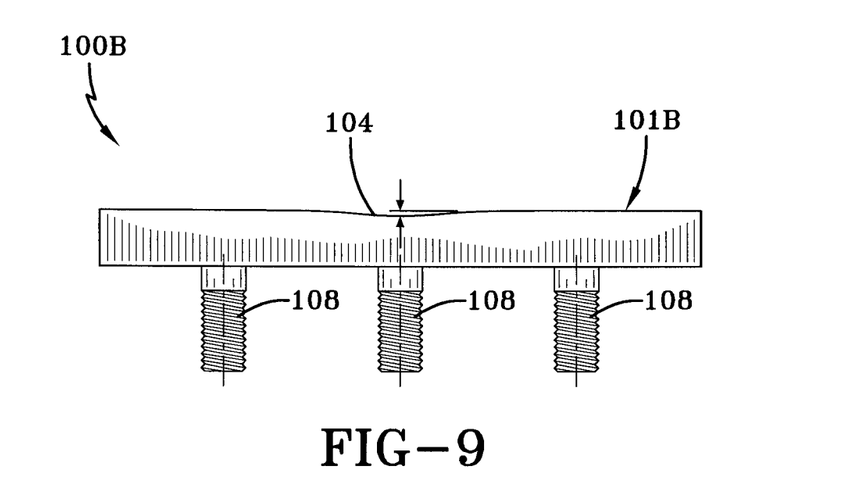
FIG. 9 is an elevational view of the sidewall insert shown in FIG. 8 according to the concepts of the present invention.

Referring now to FIGS. 8 and 9, it can be seen that an insert 100B includes a body 101B which may be provided with a depression 104. In a manner similar to the bulge, the depression 104 provides a predetermined progression from the main surface to a lowermost point in the body and then a further progression back to the main surface of the body. The slope and depth of the depression 104 is predetermined and should be detectable by the various sensors. Although not shown, skilled artisans will appreciate that the inserts 100 may provide for any combination of bulges, depressions and/or related progression in any particular order and that the resulting dimensional changes will be part of the expected measurement values. Each insert 100 may be provided with a plurality of fasteners 108 which are used to secure the insert to the pocket 96.

Figure 10:
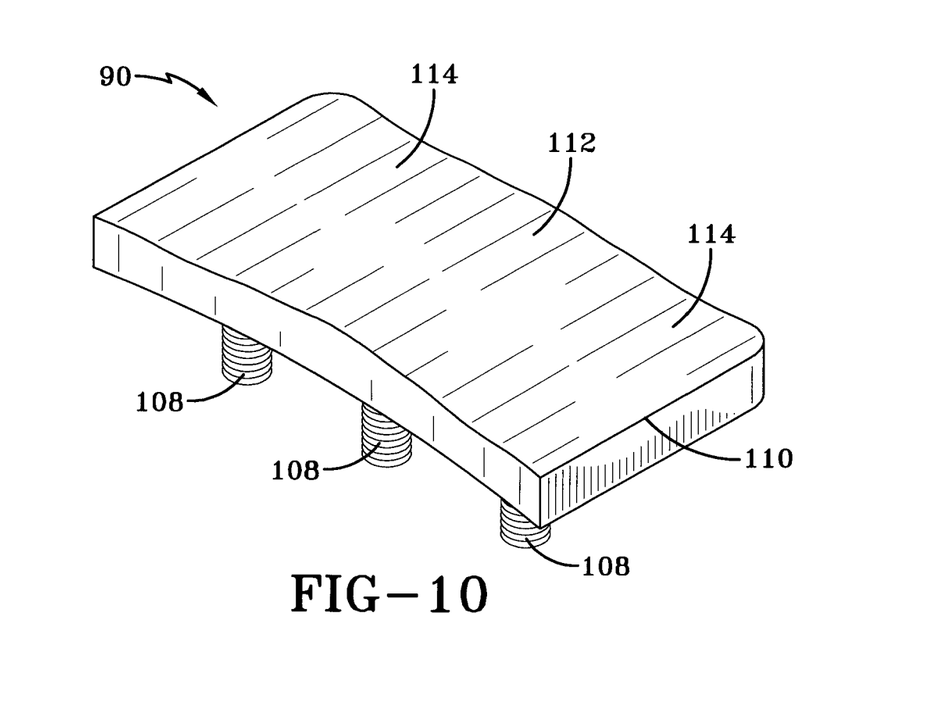
FIG. 10 is a perspective view of a tread insert with a bulge and/or a depression used with the test wheel according to the concepts of the present invention.
Figure 11:
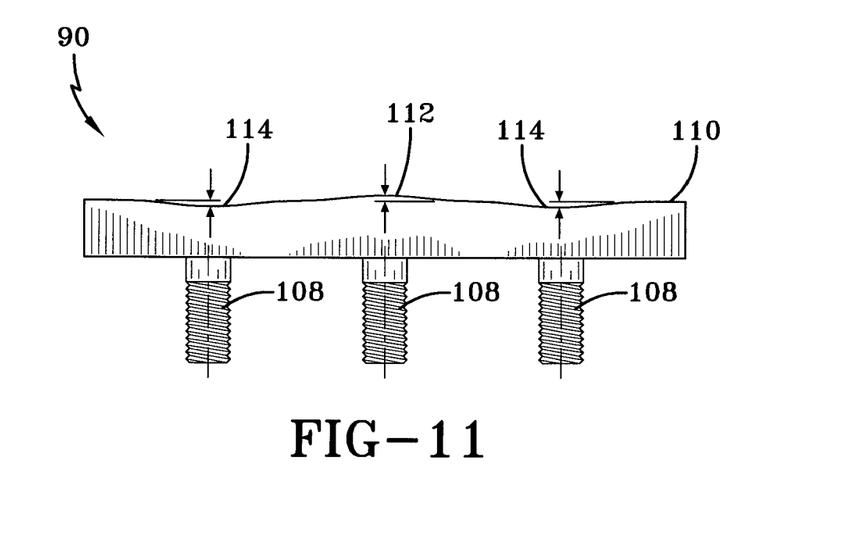
FIG. 11 is an elevational view of the tread insert shown in FIG. 10 according to the concepts of the present invention.

Referring now to FIGS. 10 and 11, it can be seen that a tread insert 90 also includes a body 110 and, as shown in FIG. 11, any combination of bulges 112 and/or depressions 114 may be provided. As with the sidewall inserts, the bulges 112 and/or depressions 114 may be provided with certain progressions or slopes and predetermined dimensions that are part of the expected measurement values for the bulge height or depression depth. The tread insert 90 may also be provided with fasteners 108 for connection of the tread insert 90 to the appropriate sub-section pocket 88.

In operation, the test wheel 10, which may or may not include the tread insert 90 and/or sidewall insert 100, is received in the tire analysis machine. In particular, the test wheel, which may be stored near the machine, will be periodically inserted into the machine to confirm that the sensors associated with the machine are in proper alignment and operation and that the software algorithms are working properly. The test wheel is placed on the conveyor 18 and then positioned between the upper and lower chuck assemblies. Upon appropriate actuation of the chuck assemblies, the test wheel 10 may be grasped, rotated at an appropriate speed, and then a test wheel measurement procedure may be initiated. In this procedure, the sensors 34A-C, 38 and/or 42 are activated and generate their corresponding signals 36A-C, 40 and 44, which are received by the controller 46 and/or the computer 48. The test wheel generates radial and lateral dimensional measurements as detected by the sensors from the tread and sidewall surfaces, including the sub-sections, the gaps and the inserts. The measured values detected by the sensors are then compared to the expected measurement values associated with the test wheel to confirm that the sensors are operating properly and within their established margins of error and that the software algorithm is performing correctly. If the sensors are not detecting measurement values within the margins of error or the software algorithm is performing incorrectly as determined by the controller and/or computer then this information is alerted to the operator who must then take the appropriate corrective action. The corrective action may be replacement of the sensors, re-alignment of the sensors, an update to the software algorithm, or whatever action is deemed appropriate. Upon completion of the test, the chuck assemblies disengage from the test wheel and then the test wheel is moved to a storage position so that the machine can be used for its normal tire testing procedures.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A test wheel used in an analysis machine, comprising:
   a hub adapted to be received in the analysis machine;
   a test ring extending from said hub, said test ring having a test surface which provides a known dimensional configuration for measurement by devices carried by the analysis machine, wherein said test surface comprises a tread surface having a known radial dimension.

2. The test wheel according to claim 1, wherein said tread surface has at least two sub-sections, and wherein at least one of said sub-sections has a first known radial dimension and another of said sub-sections has a second known radial dimension different than said first known radial dimension.

3. The test wheel according to claim 2, wherein at least one of said sub-sections has a sub-section pocket that receives a tread insert with an insert radial dimension.

4. A test wheel used in an analysis machine, comprising:
a hub adapted to be received in the analysis machine;
a test ring extending from said hub, said test ring having a test surface which provides a known dimensional configuration for measurement by devices carried by the analysis machine, wherein said test surface comprises at least one sidewall surface having a known lateral dimension.

5. The test wheel according to claim 4, wherein said at least one sidewall surface has a first known lateral dimension and a second known lateral dimension, wherein said first and second known lateral dimensions are different.

6. The test wheel according to claim 5, wherein said at least one sidewall surface has at least one sidewall pocket that receives a sidewall insert having at least one of said first and second known lateral dimensions.

7. A test wheel used in an analysis machine, comprising:
a hub adapted to be received in the analysis machine;
a test ring extending from said hub, said test ring having a test surface which provides a known dimensional configuration for measurement by devices carried by the analysis machine, wherein said test ring comprises:
at least one spoke extending from said hub;
a tread surface extending from said spoke and radially disposed around said hub; and
at least one sidewall surface extending substantially perpendicularly from said tread surface.

8. The test wheel according to claim 7, wherein said tread surface has at least two sub-sections, each sub-section having a different known radial dimension and said at least one said sidewall surface having a known lateral dimension.

9. The test wheel according to claim 8, wherein at least one of said sub-sections has a first known radial dimension and another of said sub-sections has a second known radial dimension different than said known radial dimension, and wherein said at least one sidewall surface has a first known lateral dimension and a second known lateral dimension, wherein said first and second known lateral dimensions are different.

10. An analysis machine that uses a test wheel to confirm operation of measurement sensors, comprising:
an analysis machine;
at least one laser measurement device associated with said analysis machine, wherein said at least one laser measurement device measures dimensional characteristics of tires received in said analysis machine; and
a test wheel receivable in and rotatable by said analysis machine, said test wheel having a known dimensional configuration detected by said at least one laser measurement device to confirm the accuracy of said at least one laser measurement device.

11. The analysis machine and test wheel according to claim 10, wherein said test wheel has a test surface comprising different sections, wherein each section has a different known radial dimension.

12. The analysis machine and test wheel according to claim 11, wherein at least one of said sections has a first known radial dimension and another of said sub-sections has a second known radial dimension different than said first known radial dimension.

13. The analysis machine and test wheel according to claim 10, wherein said test wheel has a test surface with at least one sidewall surface with a first known lateral dimension and wherein a portion of said at least one sidewall surface has a second known lateral dimension different than said first known lateral dimension.

14. The analysis machine and test wheel according to claim 10, wherein said test wheel comprises:
a hub engageable by said analysis machine;
at least one spoke extending from said hub; and
a test ring extending from said at least one spoke, said test ring having said known dimensional configuration.

15. The analysis machine and test wheel according to claim 14, wherein said test ring comprises:
a tread surface extending from said spoke and radially disposed around said hub; and
at least one sidewall surface extending substantially perpendicularly from said tread surface.

16. The analysis machine and test wheel according to claim 10, further comprising:
at least one of a controller or a computer connected to said at least one laser measurement device, said at least one of said controller and said computer checking measured dimensional characteristics of said test wheel against expected measurement values to validate said at least one laser measurement device.

17. The analysis machine according to claim 16, wherein at least one of said controller and said computer produces diagnostic information to be interpreted by a machine operator if no measurement readings are detected in a measurement area where expected.

* * * * *

UNITED STATES PATENT AND TRADEMARK OFFICE
CERTIFICATE OF CORRECTION

PATENT NO. : 10,302,532 B2
APPLICATION NO. : 15/283638
DATED : May 28, 2019
INVENTOR(S) : Troy L. Anenson et al.

It is certified that error appears in the above-identified patent and that said Letters Patent is hereby corrected as shown below:

On the Title Page

Item (72) Inventors:
"Troy L. Anenson, Akron, OH (US);
Byron R. Stanoszek, Hinckley, OH (US);
Daniel P. Furst, Stow, OH (US)"

Should read:
--Troy L. Anenson, Akron, OH (US);
Byron R. Stanoszek, Hinckley, OH (US);
Daniel P. Furst, Stow, OH (US);
Brian D. Mitchell, Akron, OH (US);
Michael C. Haines, Wadsworth, OH (US);
Benjamin E. Hillman, Canton, OH (US);
Jason P. Vahila, Canton, OH (US)--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*